United States Patent [19]
Fukumoto et al.

[11] Patent Number: 5,819,551
[45] Date of Patent: Oct. 13, 1998

[54] AIR CONDITIONING APPARATUS FOR A VEHICLE

[75] Inventors: Minoru Fukumoto, Nara; Norio Yoshida, Moriyama, both of Japan

[73] Assignee: Matsushita Electric Industrial Co., Ltd., Osaka, Japan

[21] Appl. No.: 684,658

[22] Filed: Jul. 19, 1996

[30] Foreign Application Priority Data

Aug. 2, 1995 [JP] Japan .................................. 7-197350

[51] Int. Cl.$^6$ .................................................. F25B 27/00
[52] U.S. Cl. ......................... 62/324.1; 62/324.6; 62/160
[58] Field of Search ............................. 62/324.1, 324.6, 62/89, 239, 243, 160, 198, 199

[56] References Cited

U.S. PATENT DOCUMENTS

| | | | |
|---|---|---|---|
| 3,460,353 | 8/1969 | Ogata et al. | 62/324.1 |
| 4,098,092 | 7/1978 | Singh | 62/324.1 |
| 4,327,561 | 5/1982 | McNeal | 62/324.1 |
| 4,938,032 | 7/1990 | Mudford | 62/160 |
| 5,299,431 | 4/1994 | Iritani et al. | 62/243 |
| 5,375,427 | 12/1994 | Hara et al. | 62/159 |
| 5,388,421 | 2/1995 | Matsuoka | 62/209 |

*Primary Examiner*—William Doerrler
*Attorney, Agent, or Firm*—Pollock, Vande Sande & Priddy

[57] ABSTRACT

A first heat exchanger implements heat exchange between refrigerant and atmosphere. A second heat exchanger implements heat exchange between the refrigerant and air directed to an interior of the vehicle. A third heat exchanger downstream of the second heat exchanger implements heat exchange between the refrigerant and the air directed to the interior of the vehicle. A four-way valve connected among a refrigerant flow restricting device, the first heat exchanger, the second heat exchanger, and the third heat exchanger for changing a flow path of the refrigerant. A bypass device allows the refrigerant to selectively flow through the second heat exchanger and bypass the second heat exchanger. During a first mode of operation, the refrigerant is circulated sequentially through a compressor, the third heat exchanger, the four-way valve, the first heat exchanger, the refrigerant flow restricting device, the four-way valve, the second heat exchanger, and the compressor. During a second mode of operation, the refrigerant is circulated sequentially through the compressor, the third heat exchanger, the four-way valve, the refrigerant flow restricting device, the first heat exchanger, the four-way valve, the second heat exchanger, and the compressor. During a third mode of operation, the refrigerant is circulated sequentially through the compressor, the third heat exchanger, the four-way valve, the refrigerant flow restricting device, the first heat exchanger, the four-way valve, and the compressor while being allowed by the bypass device to bypass the second heat exchanger.

1 Claim, 7 Drawing Sheets

AIR CONDITIONING APPARATUS FOR A VEHICLE

BACKGROUND OF THE INVENTION

1. Field of the Invention

This invention relates to an air conditioning apparatus for a vehicle such as an electric vehicle.

2. Description of the Prior Art

There are various types of air conditioners for vehicles. Each of these air conditioners generally serves to control a temperature within the interior (the passenger's compartment) of the vehicle at a desired temperature.

There is a known air conditioner for an electric vehicle which includes a heat pump. Operation of the known air conditioner can be changed among a cooling mode, a heating mode, and a dehumidifying and heating mode.

SUMMARY OF THE INVENTION

It is an object of this invention to provide an improved air conditioning apparatus for a vehicle such as an electric vehicle.

A first aspect of this invention provides an air conditioning apparatus for a vehicle which comprises a compressor; a refrigerant flow restricting device; a first heat exchanger for implementing heat exchange between refrigerant and atmosphere; a second heat exchanger for implementing heat exchange between the refrigerant and air directed to an interior of the vehicle; a third heat exchanger located downstream of the second heat exchanger with respect to a flow of the air for implementing heat exchange between the refrigerant and the air directed to the interior of the vehicle; a four-way valve connected among the refrigerant flow restricting device, the first heat exchanger, the second heat exchanger, and the third heat exchanger for changing a flow path of the refrigerant; and means for allowing the refrigerant to selectively flow through the second heat exchanger and bypass the second heat exchanger; wherein during a first mode of operation, the refrigerant is circulated sequentially through the compressor, the third heat exchanger, the four-way valve, the first heat exchanger, the refrigerant flow restricting device, the four-way valve, the second heat exchanger, and the compressor; wherein during a second mode of operation, the refrigerant is circulated sequentially through the compressor, the third heat exchanger, the four-way valve, the refrigerant flow restricting device, the first heat exchanger, the four-way valve, the second heat exchanger, and the compressor; and wherein during a third mode of operation, the refrigerant is circulated sequentially through the compressor, the third heat exchanger, the four-way valve, the refrigerant flow restricting device, the first heat exchanger, the four-way valve, and the compressor while being allowed by said means to bypass the second heat exchanger.

A second aspect of this invention provides an air conditioning apparatus comprising an air duct leading to a space to be air-conditioned; first means for driving air along the air duct toward the space; a first heat exchanger disposed in the air duct; a second heat exchanger disposed in the air duct and being downstream of the first heat exchanger with respect to a flow of the air driven by the first means; refrigerant; and second means for allowing the refrigerant to selectively flow through the first heat exchanger and bypass the first heat exchanger.

A third aspect of this invention is based on the second aspect thereof, and provides an air conditioning apparatus wherein the second means comprises a refrigerant passage bypassing the first heat exchanger, and a valve for selectively blocking and unblocking the refrigerant passage.

A fourth aspect of this invention is based on the second aspect thereof, and provides an air conditioning apparatus further comprising third means for changing a ratio between a rate of an air flow through the second heat exchanger and a rate of an air flow bypassing the second heat exchanger.

BRIEF DESCRIPTION OF THE INVENTION

DESCRIPTION OF THE PREFERRED EMBODIMENTS

A prior-art air conditioner for an electric vehicle will be described hereinafter for a better understanding of this invention.

Figure 1:
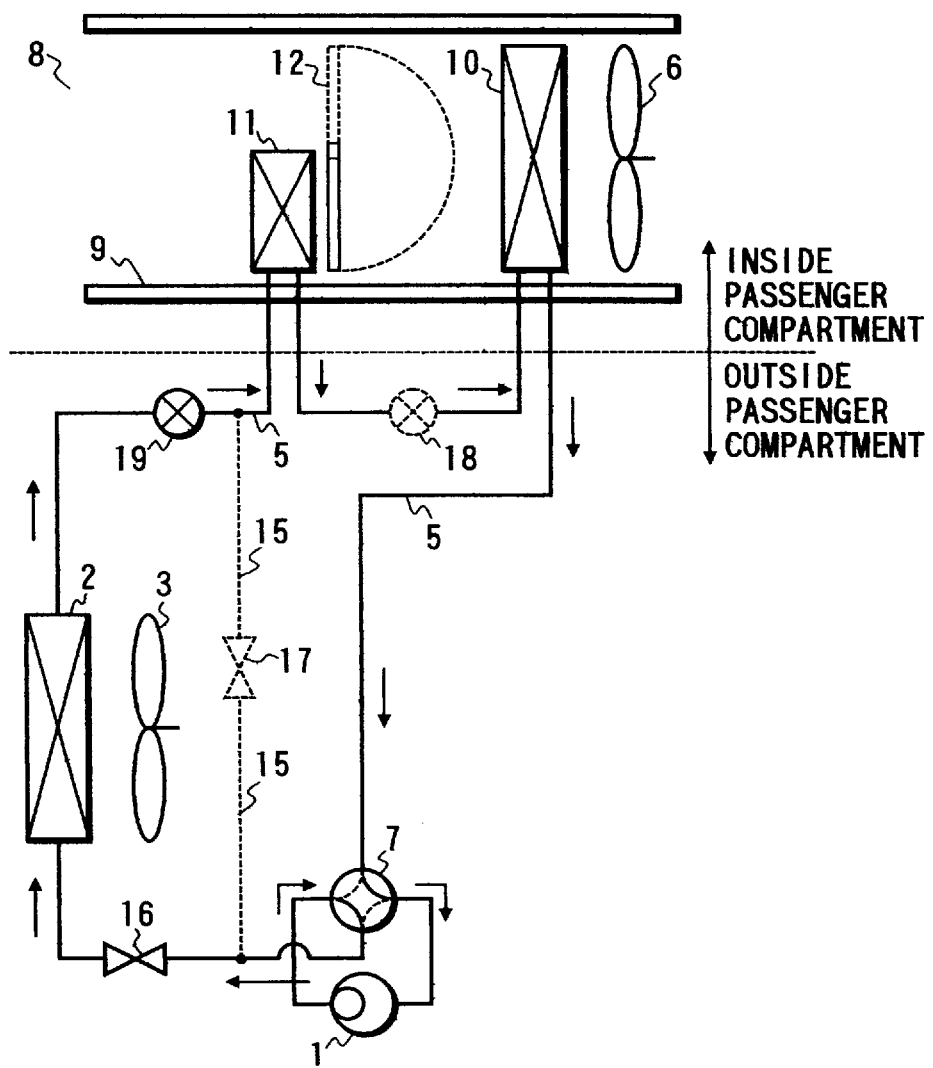
FIG. 1 is a diagram of a prior-art air conditioner which is operating in a cooling mode.
Figure 2:
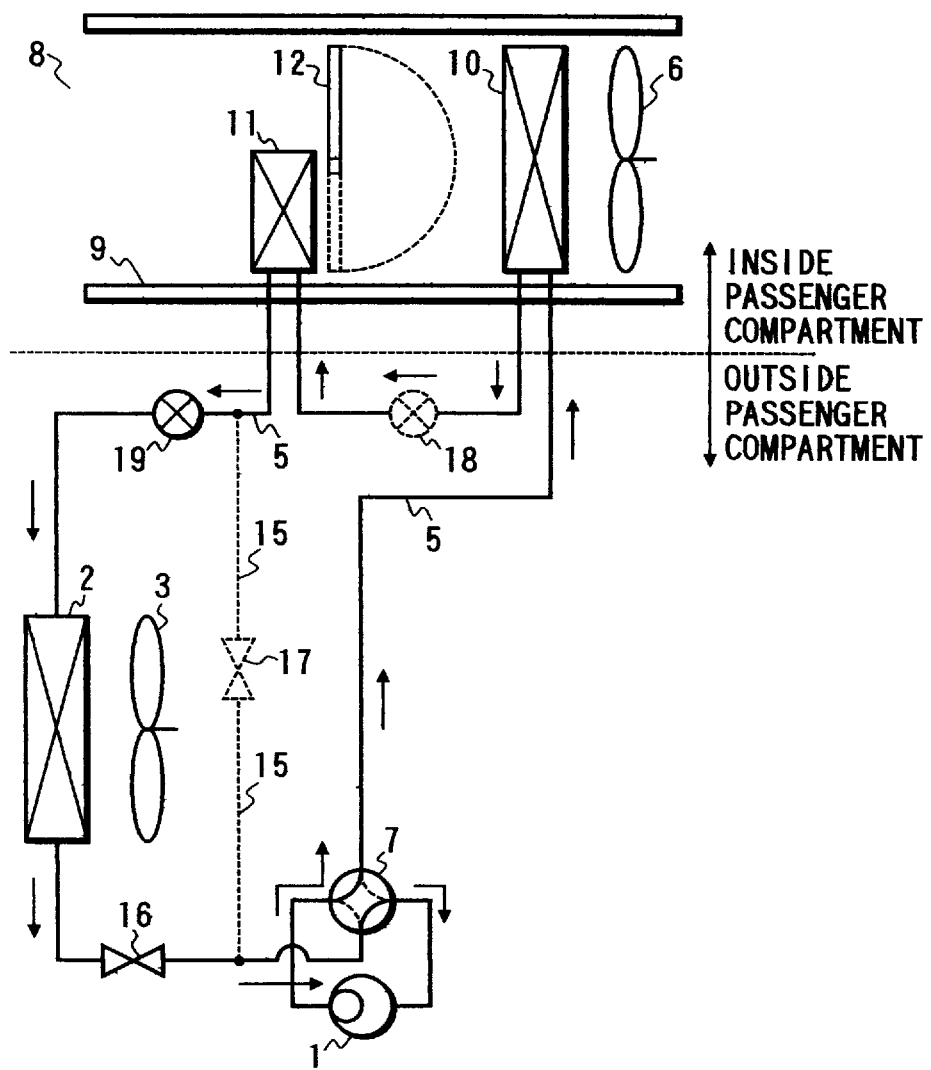
FIG. 2 is a diagram of the prior-art air conditioner which is operating in a heating mode.
Figure 3:
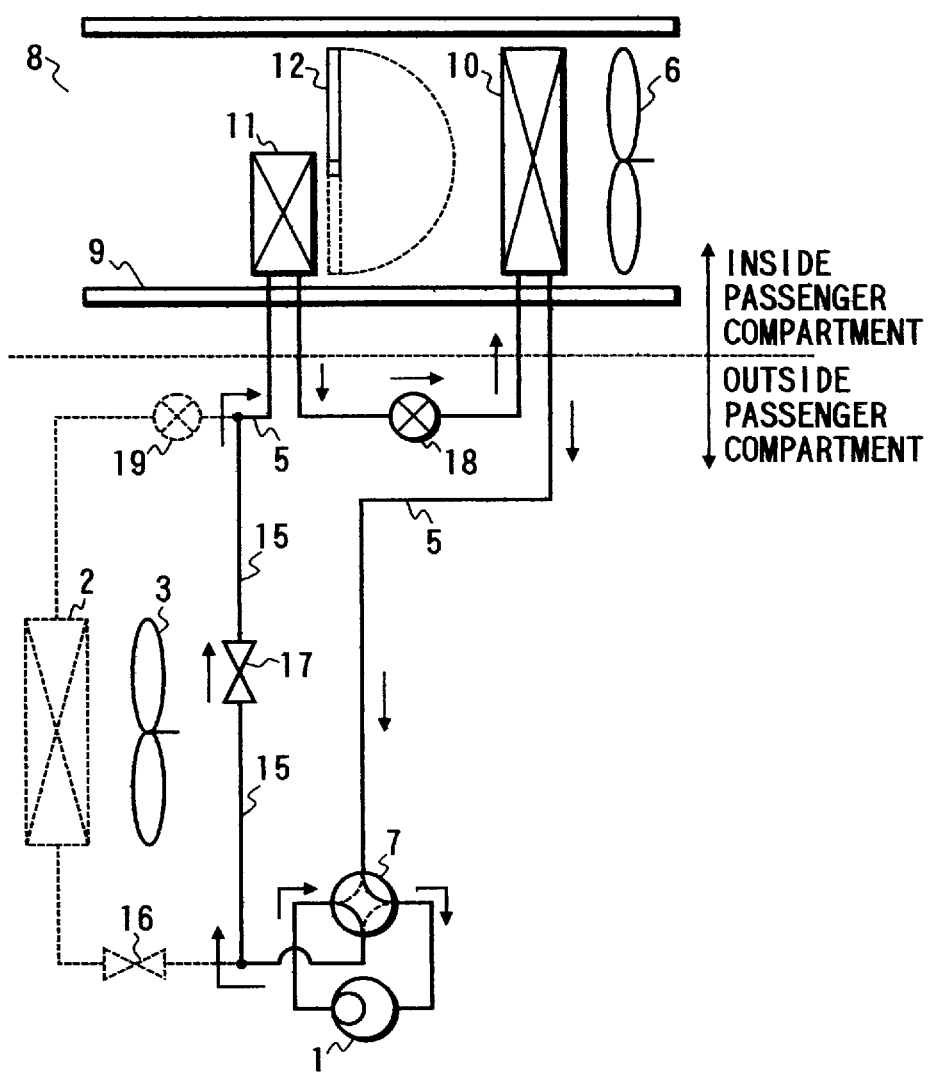
FIG. 3 is a diagram of the prior-art air conditioner which is operating in a dehumidifying and heating mode.

FIGS. 1, 2, and 3 show a prior-art air conditioner for an electric vehicle which includes a heat pump. The prior-art air conditioner of FIGS. 1–3 can execute a cooling process, a heating process, and a dehumidifying and heating process (corresponding to a cooling mode, a heating mode, and a dehumidifying and heating mode respectively).

With reference to FIGS. 1–3, the prior-art air conditioner includes an electrically-driven or motor-driven compressor 1, a heat exchanger 2, and a blower or fan 3. The heat exchanger 2 is located outside the interior (the passenger's compartment) of the vehicle. The heat exchanger 2 can be exposed to an air flow (an atmosphere flow) generated by the blower 3.

The prior-art air conditioner of FIGS. 1–3 includes a blower or fan 6 disposed in an air duct 9 having an inlet and an outlet 8. The blower 6 drives air along the air duct 9 toward a downstream side, that is, the outlet 8. The outlet 8 of the air duct 9 is exposed to the vehicle interior. A heat exchanger 10 is disposed in a region of the air duct 9 downstream of the blower 6. In addition, a heat exchanger 11 is disposed in a region of the air duct 9 downstream of the heat exchanger 10. The heat exchanger 11 covers only a part of the cross-section of the air duct 9. A rotatable mix damper 12 is disposed in a region of the air duct 9 downstream of the heat exchanger 10 and immediately upstream of the heat exchanger 11.

The mix damper 12 controls the ratio between the rate of an air flow through the heat exchanger 11 and the rate of an air flow bypassing the heat exchanger 11.

In the prior-art air conditioner of FIGS. 1–3, a four-way valve 7, the heat exchangers 2, 10, and 11, the compressor 1, an on-off valve 16, and flow control valves (refrigerant restricting valves) 18 and 19 are connected by pipes 5 in a loop where refrigerant can be circulated. The on-off valve 16 is located in the refrigerant path between the four-way valve 7 and the heat exchanger 2. The on-off valve 16 serves to selectively block and unblock a refrigerant flow. The flow control valve 18 is located in the refrigerant path between the heat exchangers 10 and 11. The flow control valve 18 serves to selectively restrict and unrestrict a refrigerant flow. The flow control valve 18 can be changed between a fully open position and a flow restricting position (a partially open position). The flow control valve 19 is located in the refrigerant path between the heat exchangers 2 and 11. The flow control valve 19 serves to selectively restrict and unrestrict a refrigerant flow. The flow control valve 19 can be changed between a fully open position and a flow restricting position (a partially open position).

In the prior-art air conditioner of FIGS. 1–3, one end of a bypass passage 15 is connected to the refrigerant path between the flow control valve 19 and the heat exchanger 11. The other end of the bypass passage 15 is connected to the refrigerant path between the four-way valve 7 and the on-off valve 16. An on-off valve 17 is disposed in the bypass passage 15. The on-off valve 17 serves to selectively block and unblock the bypass passage 15. When the on-off valve 17 blocks the bypass passage 15 and the on-off valve 16 is in its open position, refrigerant is allowed to flow through the on-off valve 16, the heat exchanger 2, and the flow-control valve 19. When the on-off valve 17 unblocks the bypass passage 15, refrigerant flows along the bypass passage 15 without passing through the on-off valve 16, the heat exchanger 2, and the flow control valve 19.

With reference to FIG. 1, during the cooling mode of operation of the prior-art air conditioner, the mix damper 12 is in a full cold position at which an air flow in the air duct 9 bypasses the heat exchanger 11. The four-way valve 7 is in a position at which refrigerant flows from the heat exchanger 10 to the compressor 1 via the four-way valve 7 and then travels from the compressor 1 toward the on-off valve 16 via the four-way valve 7. The on-off valve 16 is in its open position while the on-off valve 17 is in its closed position. The flow control valve 19 is in its flow restricting position while the flow control valve 18 is in its fully open position. During the cooling mode of operation of the prior-art air conditioner, high-temperature high-pressure refrigerant outputted from the compressor 1 travels to the heat exchanger 2 via the four-way valve 7 and the on-off valve 16. The high-temperature high-pressure refrigerant is cooled and condensed into a liquid phase by the heat exchanger 2. The refrigerant travels from the heat exchanger 2 to the flow control valve 19. The pressure of the refrigerant is reduced by the flow control valve 19. The refrigerant moves from the flow control valve 19 to the heat exchanger 10 via the heat exchanger 11 and the flow control valve 18. The heat exchanger 10 cools and dehumidifies air exposed thereto by the refrigerant. The cooled air is driven along the air duct 9 before being discharged into the vehicle interior via the air duct outlet 8. The refrigerant evaporates due to the heat exchange implemented by the heat exchanger 10. The refrigerant returns to the compressor 1 from the heat exchanger 10 via the four-way valve 7.

With reference to FIG. 2, during the heating mode of operation of the prior-art air conditioner, the mix damper 12 is in a full hot position at which an air flow in the air duct 9 is directed to the heat exchanger 11. The four-way valve 7 is in a position at which refrigerant flows from the on-off valve 16 to the compressor 1 via the four-way valve 7 and then travels from the compressor 1 toward the heat exchanger 10 via the four-way valve 7. The on-off valve 16 is in its open position while the on-off valve 17 is in its closed position. The flow control valve 19 is in its flow restricting position while the flow control valve 18 is in its fully open position. During the heating mode of operation of the prior-art air conditioner, high-temperature high-pressure refrigerant outputted from the compressor 1 travels to the heat exchanger 10 via the four-way valve 7. The heat exchanger 10 heats air exposed thereto by the refrigerant. The heated air is guided from the heat exchanger 10 to the heat exchanger 11 along the air duct 9 via the mix damper 12. The high-temperature high-pressure refrigerant is cooled and condensed into a liquid phase by the heat exchanger 10. The refrigerant travels from the heat exchanger 10 to the heat exchanger 11 via the flow control valve 18. The heat exchanger 11 heats air exposed thereto by the refrigerant. The heated air is driven along the air duct 9 before being discharged into the vehicle interior via the air duct outlet 8. In this way, the air flow in the air duct 9 is successively heated by the heat exchangers 10 and 11. The refrigerant cools due to the heat exchange implemented by the heat exchanger 11. The refrigerant travels from the heat exchanger 11 to the flow control valve 19. The pressure of the refrigerant is reduced by the flow control valve 19. The refrigerant moves from the flow control valve 19 to the heat exchanger 2. The heat exchanger 2 heats and evaporates the refrigerant. The refrigerant returns to the compressor 1 from the heat exchanger 2 via the on-off valve 16 and the four-way valve 7.

With reference to FIG. 3, during the dehumidifying and heating mode of operation of the prior-art air conditioner, the mix damper 12 is in the full hot position at which an air flow in the air duct 9 is directed to the heat exchanger 11. The four-way valve 7 is in the position at which refrigerant flows from the heat exchanger 10 to the compressor 1 via the four-way valve 7 and then travels from the compressor 1 toward the on-off valve 17 via the four-way valve 7.

The on-off valve 16 is in its closed position while the on-off valve 17 is in its open position. The flow control valve 18 is in its flow restricting position. During the dehumidifying and heating mode of operation of the prior-art air conditioner, high-temperature high-pressure refrigerant outputted from the compressor 1 travels to the heat exchanger 11 via the four-way valve 7 and the on-off valve 17. The heat exchanger 11 heats air exposed thereto by the refrigerant. The heated air is driven along the air duct 9 before being discharged into the vehicle interior via the air duct outlet 8. The high-temperature high-pressure refrigerant is cooled and condensed into a liquid phase by the heat exchanger 11. The refrigerant travels from the heat exchanger 11 to the flow control valve 18. The pressure of the refrigerant is reduced by the flow control valve 18. The refrigerant moves from the flow control valve 18 to the heat exchanger 10. The heat exchanger 10 cools and dehumidifies air exposed thereto by the refrigerant. The cooled and dehumidified air is guided from the heat exchanger 10 to the heat exchanger 11 along the air duct 9 via the mix damper 12. In this way, the air flow in the air duct 9 is cooled and dehumidified by the heat exchanger 10, and is then heated by the heat exchanger 11.

The refrigerant evaporates due to the heat exchange implemented by the heat exchanger 10. The refrigerant returns to the compressor 1 from the heat exchanger 10 via the four-way valve 7.

In the case where the cooling mode and the heating mode of operation of the prior-art air conditioner of FIGS. 1–3 are successively executed, the following problem tends to arise. During the cooling mode of operation, air is cooled by the heat exchanger 10 while being dehumidified thereby. Accordingly, water (dew) appears on the heat exchanger 10. When the cooling mode of operation is replaced by the heating mode of operation, the water on the heat exchanger 10 starts to be heated by the heat exchanger 10. Thus, the water vaporizes into heated air. The resultant heated and humid air is discharged into the vehicle interior via the air duct outlet 8.

In the case where the cooling mode and the heating mode of operation of the prior-art air conditioner of FIGS. 1–3 are alternately executed, the following problem tends to arise. During the cooling mode of operation, the heat exchanger 10 is subjected to a pressure of 0.1–0.2 MPa. During the heating mode of operation, the heat exchanger 10 is subjected to a pressure of 1.5–2.0 MPa. Thus, the heat exchanger 10 is alternately subjected to a low pressure and a high pressure which greatly differ from each other. This tends to decrease the reliability of operation of the heat exchanger 10.

A description will now be given of an air conditioning apparatus for an electric vehicle according to an embodiment of this invention. The air conditioning apparatus of the embodiment of this invention can execute a cooling process, a heating process, a first dehumidifying and heating process, and a second dehumidifying and heating process (corresponding to a cooling mode, a heating mode, a first dehumidifying and heating mode, and a second dehumidifying and heating mode respectively).

With reference to FIGS. 4, 5, 6, and 7, the air conditioning apparatus of the embodiment of this invention includes an electrically-driven or motor-driven compressor 101, a heat exchanger 102, and a blower or fan 103. The heat exchanger 102 is located outside the interior (the passenger's compartment) of the vehicle. The heat exchanger 102 can be exposed to an air flow (an atmosphere flow) generated by the blower 103.

The air conditioning apparatus of FIGS. 4–7 includes a blower or fan 106 disposed in an air duct 109 having an inlet and an outlet 108. The blower 106 drives air along the air duct 109 toward a downstream side, that is, the outlet 108. The outlet 108 of the air duct 109 is exposed to the vehicle interior. A heat exchanger 110 is disposed in a region of the air duct 109 downstream of the blower 106. In addition, a heat exchanger 111 is disposed in a region of the air duct 109 downstream of the heat exchanger 110. The heat exchanger 111 covers a part of the cross-section of the air duct 109. A rotatable mix damper 112 is disposed in a region of the air duct 109 downstream of the heat exchanger 110 and immediately upstream of the heat exchanger 111. The mix damper 112 controls the ratio between the rate of an air flow through the heat exchanger 111 and the rate of an air flow bypassing the heat exchanger 111.

In the air conditioning apparatus of FIGS. 4–7, a flow control valve (a refrigerant restricting valve or a refrigerant restrictor) 104, a four-way valve 107, the heat exchangers 102, 110, and 111, the compressor 101, and a three-way valve 114 are connected by pipes 105 in a loop where refrigerant can be circulated. The connection among the devices in the refrigerant flow circuit will now be described in more detail. The outlet of the compressor 101 is connected to a first end of the heat exchanger 111. A second end of the heat exchanger 111 is connected to a first port of the four-way valve 107. A second port of the four-way valve 107 is connected to a first end of the heat exchanger 102. A second end of the heat exchanger 102 is connected to a third port of the four-way valve 107 via the flow control valve 104. A fourth port of the four-way valve 107 is connected to a first port of the three-way valve 114. A second port of the three-way valve 114 is connected to a first end of the heat exchanger 110. A second end of the heat exchanger 110 is connected to the inlet of the compressor 101. A third port of the three-way valve 114 is connected via a bypass passage 113 to the refrigerant path between the heat exchanger 110 and the compressor 101. The three-way valve 114 can be changed between a first position and a second position. When the three-way valve 114 assumes its first position, refrigerant is allowed to flow through the heat exchanger 110. When the three-way valve 114 assumes its second position, refrigerant flows through the bypass passage 113 and bypasses the heat exchanger 110. The flow control valve 104 serves to selectively restrict and unrestrict a refrigerant flow. The flow control valve 104 can be changed between a fully open position and a flow restricting position (a partially open position).

Figure 4:
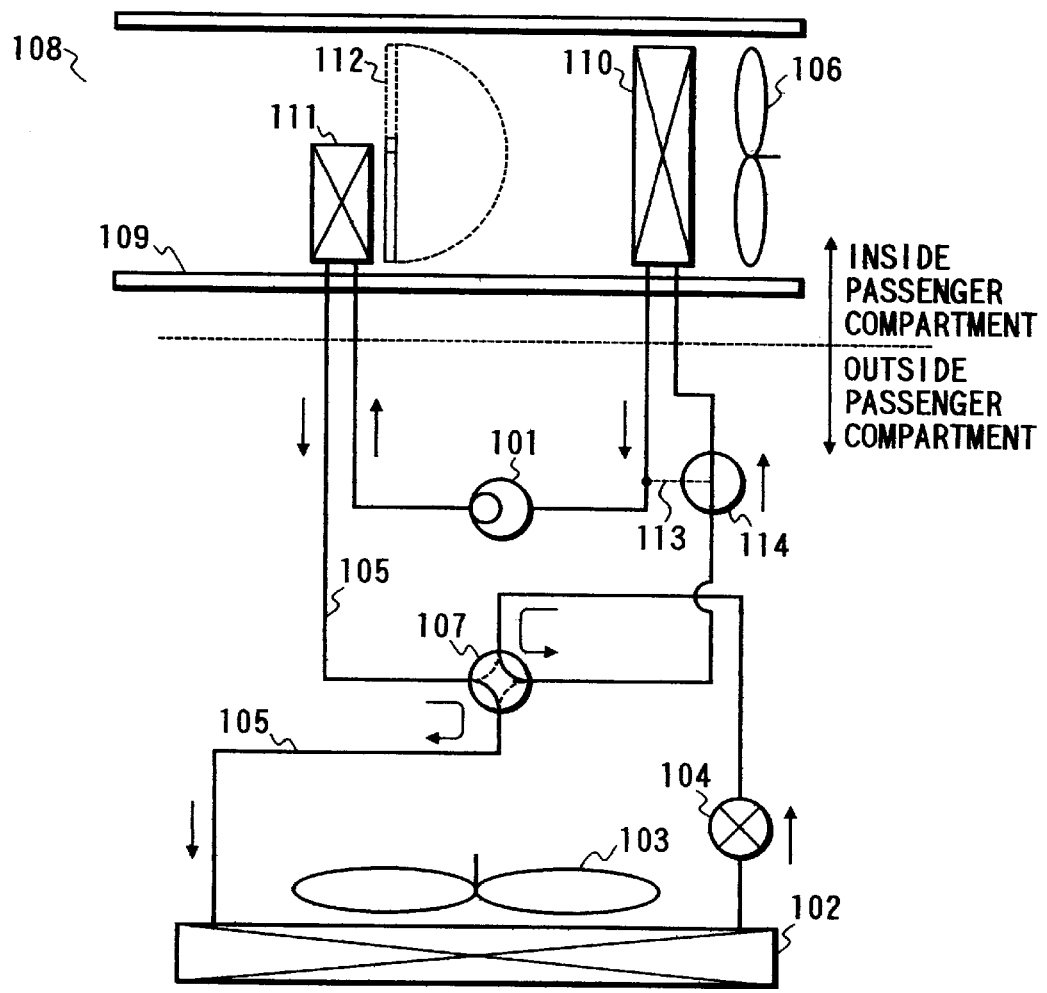
FIG. 4 is a diagram of an air conditioning apparatus, which is operating in a cooling mode, according to an embodiment of this invention.

With reference to FIG. 4, during the cooling mode of operation of the air conditioning apparatus, the mix damper 112 is in a full cold position at which an air flow in the air duct 109 bypasses the heat exchanger 111. The four-way valve 107 is in a position at which refrigerant flows from the heat exchanger 111 to the heat exchanger 102 via the four-way valve 107, and flows from the flow control valve 104 to the three-way valve 114 via the four-way valve 107. The three-way valve 114 is in a position at which refrigerant flows from the four-way valve 107 to the heat exchanger 110 via the three-way valve 114. The flow control valve 104 is in its flow restricting position. During the cooling mode of operation of the air conditioning apparatus, high-temperature high-pressure refrigerant outputted from the compressor 101 travels to the heat exchanger 102 via the heat exchanger 111 and the four-way valve 107. The high-temperature high-pressure refrigerant is cooled and condensed into a liquid phase by the heat exchanger 102. The refrigerant travels from the heat exchanger 102 to the flow control valve 104. The pressure of the refrigerant is reduced by the flow control valve 104. The refrigerant moves from the flow control valve 104 to the heat exchanger 110 via the four-way valve 107 and the three-way valve 114. The heat exchanger 110 cools and dehumidifies air exposed thereto by the refrigerant. The cooled air is driven along the air duct 109 before being discharged into the vehicle interior via the air duct outlet 108. The refrigerant evaporates due to the heat exchange implemented by the heat exchanger 110. The refrigerant returns to the compressor 101 from the heat exchanger 110.

Figure 5:
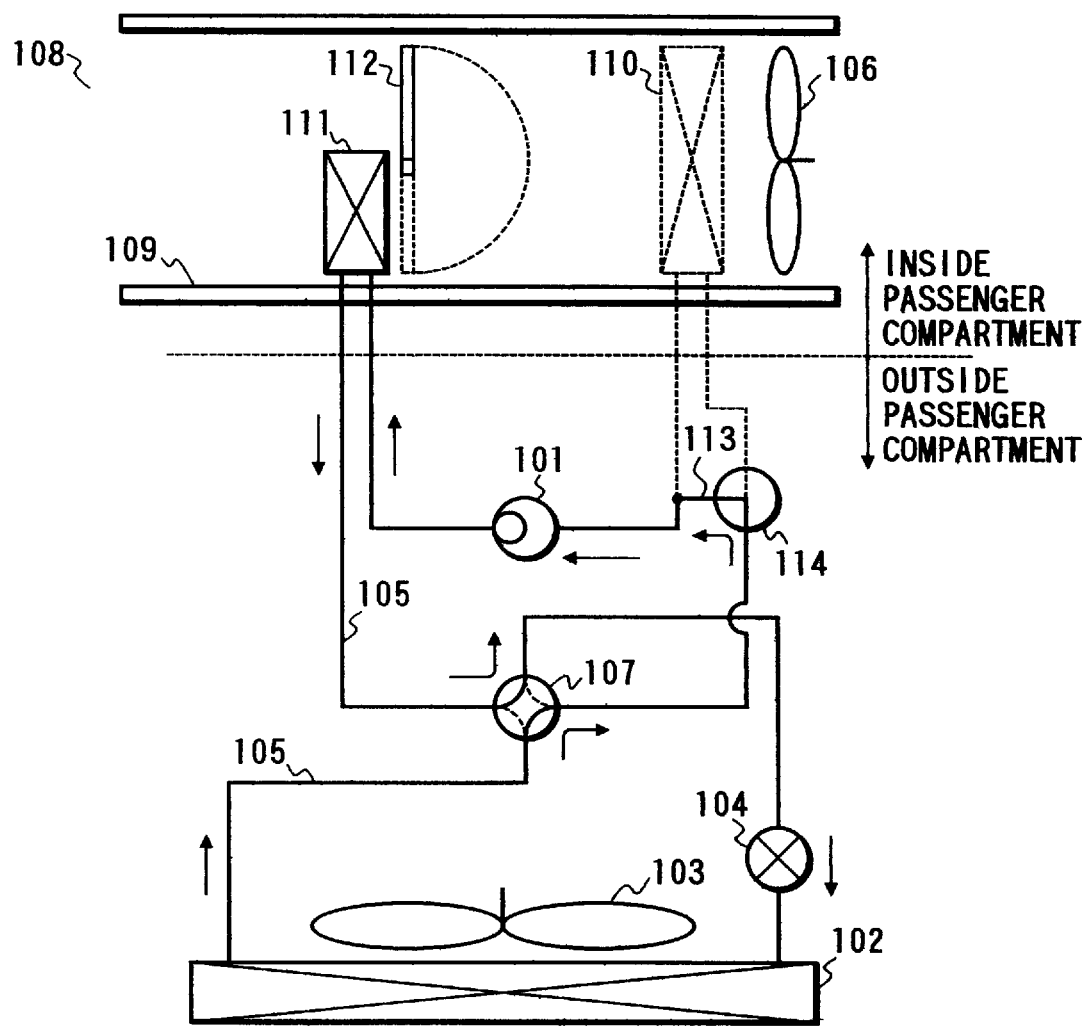
FIG. 5 is a diagram of the air conditioning apparatus of the embodiment of this invention which is operating in a heating mode.

With reference to FIG. 5, during the heating mode of operation of the air conditioning apparatus, the mix damper 112 is in a full hot position at which an air flow in the air duct 109 is directed to the heat exchanger 111. The four-way valve 107 is in a position at which refrigerant flows from the heat exchanger 111 to the flow control valve 104 via the four-way valve 107, and flows from the heat exchanger 102 to the three-way valve 114 via the four-way valve 107. The three-way valve 114 is in a position at which refrigerant flows along the bypass passage 113 and bypasses the heat exchanger 110. The flow control valve 104 is in its flow restricting position. During the heating mode of operation of the air conditioning apparatus, high-temperature high-pressure refrigerant outputted from the compressor 101 travels to the heat exchanger 111. The heat exchanger 111 heats air exposed thereto by the refrigerant. The heated air is driven along the air duct 109 before being discharged into the vehicle interior via the air duct outlet 108. The high-temperature high-pressure refrigerant is cooled and condensed into a liquid phase by the heat exchanger 111. The refrigerant travels from the heat exchanger 111 to the flow control valve 104 via the four-way valve 107. The pressure of the refrigerant is reduced by the flow control valve 104. The refrigerant moves from the flow control valve 104 to the heat exchanger 102. The heat exchanger 102 heats and evaporates the refrigerant. The refrigerant returns to the compressor 101 from the heat exchanger 102 via the four-way valve 107, the three-way valve 114, and the bypass passage 113. During the heating mode of operation of the air conditioning apparatus, the refrigerant is inhibited from flowing through the heat exchanger 110, and the heat exchanger 110 remains inactive. Thus, the heat exchanger 110 remains subjected to conditions having a low temperature and a low pressure.

Figure 6:
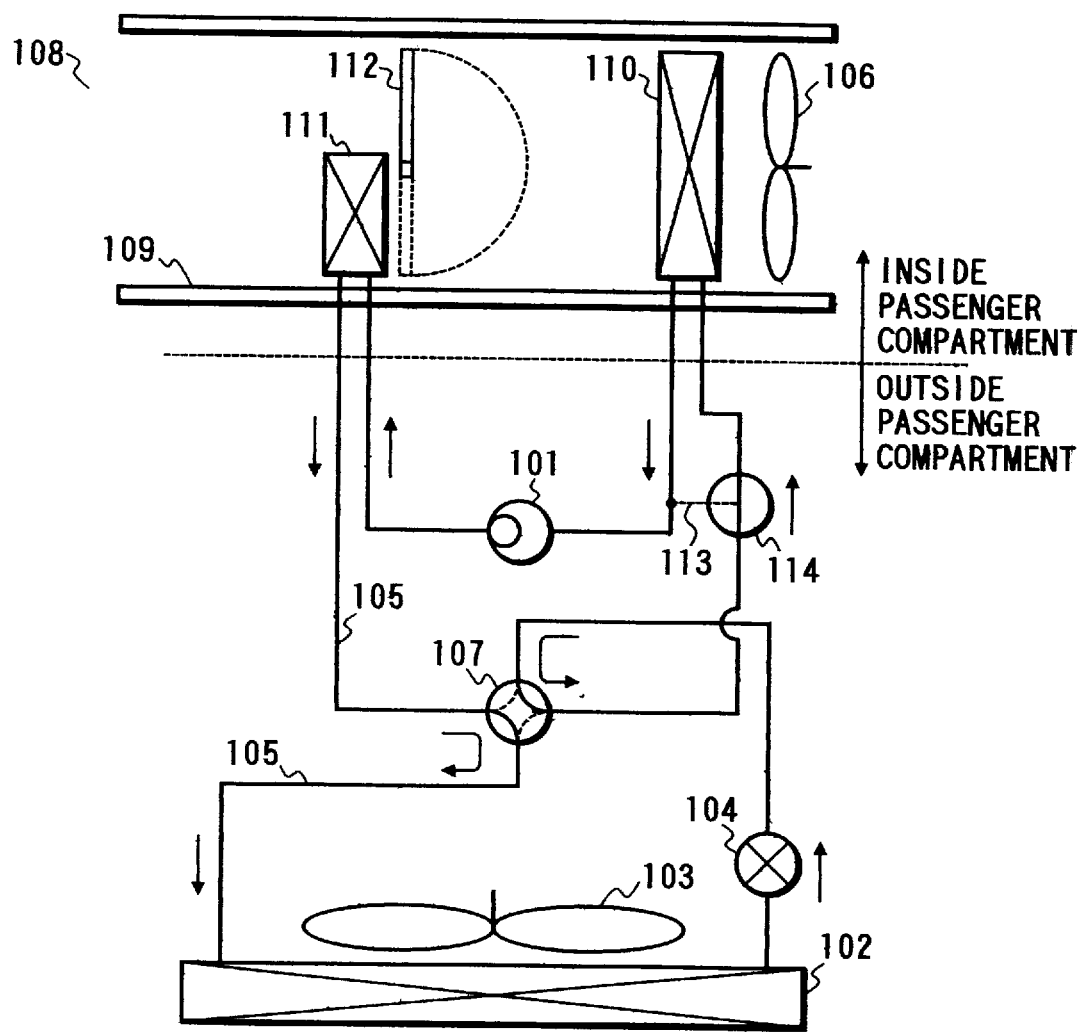
FIG. 6 is a diagram of the air conditioning apparatus of the embodiment of this invention which is operating in a first dehumidifying and heating mode.

With reference to FIG. 6, during the first dehumidifying and heating mode of operation of the air conditioning apparatus, the mix damper 112 is in the full hot position at which an air flow in the air duct 109 is directed to the heat exchanger 111. The four-way valve 107 is in the position at which refrigerant flows from the heat exchanger 111 to the heat exchanger 102 via the four-way valve 107, and flows from the flow control valve 104 to the three-way valve 114 via the four-way valve 107. The three-way valve 114 is in the position at which refrigerant flows from the four-way valve 107 to the heat exchanger 110 via the three-way valve 114. The flow control valve 104 is in its flow restricting position. During the first dehumidifying and heating mode of operation of the air conditioning apparatus, high-temperature high-pressure refrigerant outputted from the compressor 101 travels to the heat exchanger 111. The heat exchanger 111 heats air exposed thereto by the refrigerant. The heated air is driven along the air duct 109 before being discharged into the vehicle interior via the air duct outlet 108. The high-temperature high-pressure refrigerant is cooled and condensed into a liquid phase by the heat exchanger 111. The refrigerant travels from the heat exchanger 111 to the heat exchanger 102 via the four-way valve 107. The refrigerant is further cooled and condensed into a liquid phase by the heat exchanger 102. The refrigerant travels from the heat exchanger 102 to the flow control valve 104. The pressure of the refrigerant is reduced by the flow control valve 104. The refrigerant moves from the flow control valve 104 to the heat exchanger 110 via the four-way valve 107 and the three-way valve 114. The heat exchanger 110 cools and dehumidifies air exposed thereto by the refrigerant. The cooled and dehumidified air is guided from the heat exchanger 110 to the heat exchanger 111 along the air duct 109 via the mix damper 112. In this way, the air flow in the air duct 109 is cooled and dehumidified by the heat exchanger 110, and is then heated by the heat exchanger 111. The refrigerant evaporates due to the heat exchange implemented by the heat exchanger 110. The refrigerant returns to the compressor 101 from the heat exchanger 110. During the first dehumidifying and heating mode of operation of the air conditioning apparatus, the heat exchanger 110 remains subjected to conditions having a low temperature and a low pressure. In addition, cooling and condensing the refrigerant are implemented by both the heat exchangers 102 and 111. This is effective to provide reliable condensation of the refrigerant and a high efficiency of operation of the air conditioning apparatus.

During the first dehumidifying and heating mode of operation of the air conditioning apparatus, the mix damper 112 may be out of the full hot position. In this case, the flow rate of air heated by the heat exchanger 111, that is, the temperature of air discharged into the vehicle interior via the air duct outlet 108, depends on the position of the mix damper 112.

Figure 7:
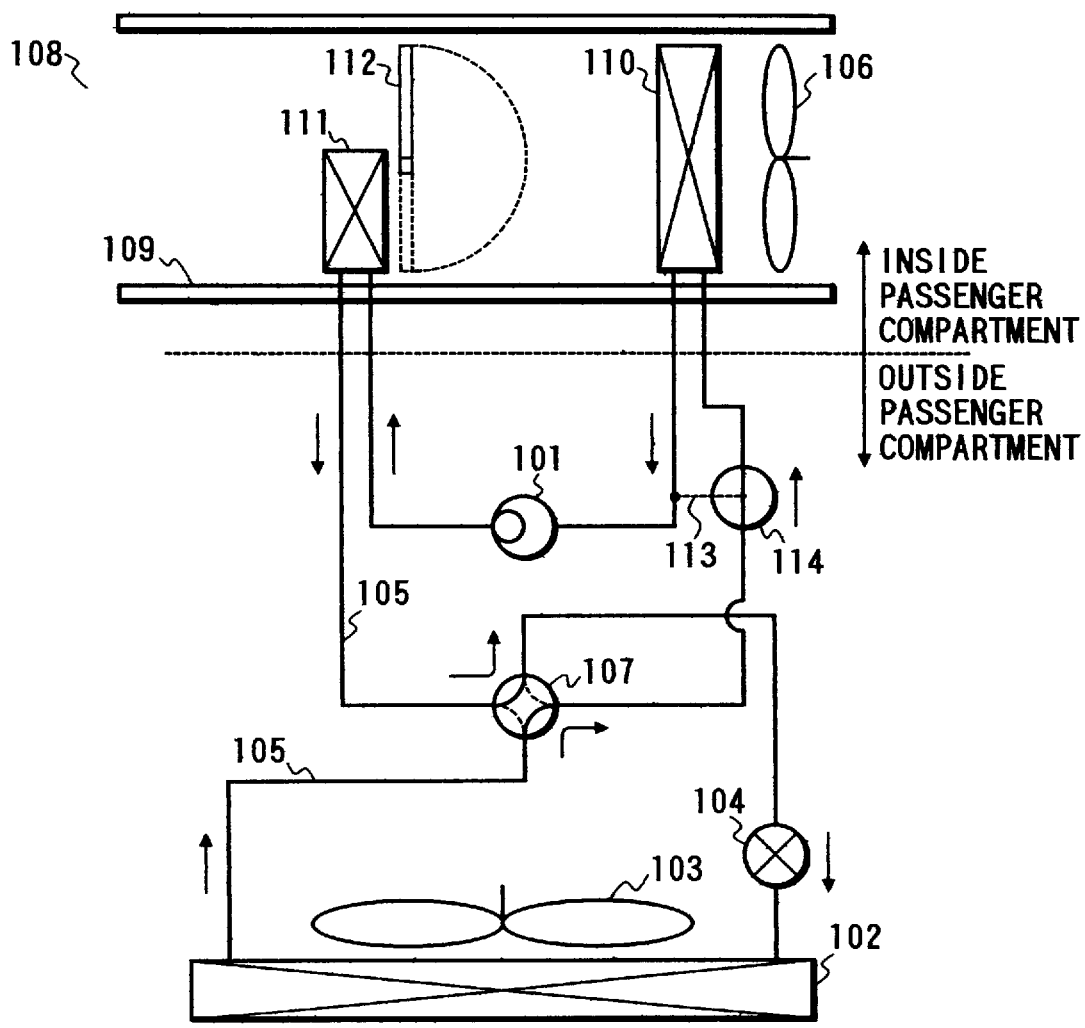
FIG. 7 is a diagram of the air conditioning apparatus of the embodiment of this invention which is operating in a second dehumidifying and heating mode.

With reference to FIG. 7, during the second dehumidifying and heating mode of operation of the air conditioning apparatus, the mix damper 112 is in the full hot position at which an air flow in the air duct 109 is directed to the heat exchanger 111. The four-way valve 107 is in the position at which refrigerant flows from the heat exchanger 111 to the flow control valve 104 via the four-way valve 107, and flows from the heat exchanger 102 to the three-way valve 114 via the four-way valve 107. The three-way valve 114 is in the position at which refrigerant flows from the four-way valve 107 to the heat exchanger 110 via the three-way valve 114. The flow control valve 104 is in its flow restricting position. During the second dehumidifying and heating mode of operation of the air conditioning apparatus, high-temperature high-pressure refrigerant outputted from the compressor 101 travels to the heat exchanger 111. The heat exchanger 111 heats air exposed thereto by the refrigerant. The heated air is driven along the air duct 109 before being discharged into the vehicle interior via the air duct outlet 108. The high-temperature high-pressure refrigerant is cooled and condensed into a liquid phase by the heat exchanger 111. The refrigerant travels from the heat exchanger 111 to the flow control valve 104 via the four-way valve 107. The pressure of the refrigerant is reduced by the flow control valve 104. The refrigerant moves from the flow control valve 104 to the heat exchanger 102. The heat exchanger 102 heats and evaporates the refrigerant. The refrigerant travels from the heat exchanger 102 to the heat exchanger 110 via the four-way valve 107 and the three-way valve 114. The heat exchanger 110 cools and dehumidifies air exposed thereto by the refrigerant. The cooled and dehumidified air is guided from the heat exchanger 110 to the heat exchanger 111 along the air duct 109 via the mix damper 112. In this way, the air flow in the air duct 109 is cooled and dehumidified by the heat exchanger 110, and is then heated by the heat exchanger 111. The refrigerant further evaporates due to the heat exchange implemented by the heat exchanger 110. The refrigerant returns to the compressor 101 from the heat exchanger 110. During the second dehumidifying and heating mode of operation of the air conditioning apparatus, the heat exchanger 110 remains subjected to conditions having a low temperature and a low pressure. In addition, evaporation of the refrigerant is implemented by both the heat exchangers 102 and 110. This is effective to provide reliable evaporation of the refrigerant and a high efficiency of operation of the air conditioning apparatus.

As previously described, during each of the cooling mode and the heating mode of operation of the air conditioning apparatus, the heat exchanger 110 remains subjected to conditions having a low temperature and a low pressure. When the cooling mode of operation is replaced by the heating mode of operation, it is thus possible to prevent water on the heat exchanger 110 from being heated and being vaporized into air. Accordingly, heated and humid air is prevented from entering the vehicle interior via the air duct outlet 108. In addition, the continuous exposure of the heat exchanger 110 to a low pressure can maintain a high reliability of operation of the heat exchanger 110.

It should be noted that the three-way valve 114 may be replaced by an on-off valve disposed in the bypass passage 113. Further, the flow control valve 104 may be replaced by a capillary tube, an electrically-driven expansion valve, or a temperature-responsive expansion valve.

What is claimed is:

1. An air conditioning apparatus for a vehicle, comprising:

a compressor;

a refrigerant flow restricting device;

a first heat exchanger for implementing heat exchange between refrigerant and the atmosphere;

a second heat exchanger for implementing heat exchange between the refrigerant and air directed to an interior of the vehicle;

a third heat exchanger located downstream of the second heat exchanger with respect to a flow of the air for implementing heat exchange between the refrigerant and the air directed to the interior of the vehicle;

a four-way valve connected among the refrigerant flow restricting device, the first heat exchanger, the second heat exchanger, and the third heat exchanger for changing a flow path of the refrigerant; and means for allowing the refrigerant to selectively flow through the second heat exchanger and bypass the second heat exchanger;

wherein during a first mode of operation, the refrigerant is circulated sequentially through the compressor, the third heat exchanger, the four-way valve, the first heat exchanger, the refrigerant flow restricting device, the four-way valve, the second heat exchanger, and the compressor;

during a second mode of operation, the refrigerant is circulated sequentially through the compressor, the third heat exchanger, the four-way valve, the refrigerant flow restricting device, the first heat exchanger, the four-way valve, the second heat exchanger, and the compressor; and during a third mode of operation, the refrigerant is circulated sequentially through the compressor, the third heat exchanger, the four-way valve, the refrigerant flow restricting device, the first heat exchanger, the four-way valve, and the compressor while being allowed by said means to by pass the second heat exchanger.

* * * * *